(12) United States Patent
Tsunoda

(10) Patent No.: US 10,623,103 B2
(45) Date of Patent: Apr. 14, 2020

(54) DRIVER CIRCUIT, OPTICAL MODULE, AND ACTIVE OPTICAL CABLE

(71) Applicant: FUJITSU LIMITED, Kawasaki-shi, Kanagawa (JP)

(72) Inventor: Yukito Tsunoda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/984,833

(22) Filed: May 21, 2018

(65) Prior Publication Data
US 2018/0343063 A1 Nov. 29, 2018

(30) Foreign Application Priority Data
May 24, 2017 (JP) ................. 2017-102422

(51) Int. Cl.
| | | |
|---|---|---|
| H04B 10/58 | (2013.01) | |
| H04B 10/50 | (2013.01) | |
| H04L 25/02 | (2006.01) | |
| H04B 10/54 | (2013.01) | |

(52) U.S. Cl.
CPC ......... H04B 10/504 (2013.01); H04B 10/541 (2013.01); H04B 10/58 (2013.01); H04L 25/0272 (2013.01); H04L 25/0286 (2013.01)

(58) Field of Classification Search
USPC ....................................... 398/193
See application file for complete search history.

(56) References Cited

U.S. PATENT DOCUMENTS

| | | | | |
|---|---|---|---|---|
| 3,944,853 A | * | 3/1976 | Cooper ............... | H03G 9/18 327/306 |
| 4,992,754 A | * | 2/1991 | Blauvelt ............ | H03F 1/3252 327/100 |
| 5,132,639 A | * | 7/1992 | Blauvelt ............ | H03F 1/3252 327/100 |
| 5,252,930 A | * | 10/1993 | Blauvelt ............ | H03F 1/3252 327/100 |
| 5,430,569 A | * | 7/1995 | Blauvelt ............ | H04B 10/2507 398/199 |
| 5,798,854 A | * | 8/1998 | Blauvelt ............ | H03F 1/3252 327/362 |

(Continued)

FOREIGN PATENT DOCUMENTS

| | | |
|---|---|---|
| JP | 2004-273631 | 9/2004 |
| JP | 2012-43933 | 3/2012 |

(Continued)

OTHER PUBLICATIONS

Electronics Tutorial, RC Waveforms, 2015 (Year: 2015).*

(Continued)

*Primary Examiner* — Jai M Lee
(74) *Attorney, Agent, or Firm* — Fujitsu Patent Center

(57) ABSTRACT

There is provided a driver circuit configured to drive a light emitting device, the driver circuit including an asymmetric circuit configured to receive an input signal and include a first capacitor coupled to the input signal and a signal having a fixed electric potential so as to generate a first signal, a delay circuit configured to receive the input signal and delay the input signal so as to generate a second signal, and an adder circuit configured to add the first signal and the second signal so as to generate a drive signal for driving the light emitting device.

15 Claims, 15 Drawing Sheets

(56) References Cited

U.S. PATENT DOCUMENTS

| | | | | |
|---|---|---|---|---|
| 6,288,814 | B1* | 9/2001 | Blauvelt | H03F 1/3252 398/193 |
| 6,519,374 | B1* | 2/2003 | Stook | H03F 1/3223 385/1 |
| 6,917,764 | B1* | 7/2005 | Wilson | H04B 10/58 330/149 |
| 7,004,644 | B1* | 2/2006 | Johnson | G02B 6/4204 257/680 |
| 7,466,925 | B2* | 12/2008 | Iannelli | H04B 10/504 398/182 |
| 7,634,198 | B2* | 12/2009 | Peral | H03F 1/32 327/317 |
| 8,630,369 | B2* | 1/2014 | Tsunoda | H04L 25/0286 375/296 |
| 8,718,488 | B2* | 5/2014 | Sugawara | H04B 10/58 398/193 |
| 8,791,652 | B2* | 7/2014 | Oku | H01S 5/0428 315/297 |
| 9,735,879 | B2* | 8/2017 | Doany | H04B 10/508 |
| 10,367,591 | B2* | 7/2019 | Raj | H04B 10/516 |
| 2004/0174916 | A1 | 9/2004 | Chujo et al. | |
| 2006/0115277 | A1* | 6/2006 | Yamada | G02B 6/4202 398/143 |
| 2009/0039860 | A1* | 2/2009 | Suzuki | H04B 10/502 323/312 |
| 2012/0045217 | A1* | 2/2012 | Tsunoda | H03K 5/1565 398/182 |
| 2012/0045223 | A1* | 2/2012 | Oku | H04B 10/504 398/201 |
| 2012/0224849 | A1* | 9/2012 | Rylyakov | H04B 10/2507 398/27 |
| 2013/0170580 | A1* | 7/2013 | Tsunoda | H04L 25/0286 375/296 |
| 2014/0140708 | A1* | 5/2014 | Tsunoda | H04B 10/588 398/192 |
| 2015/0207500 | A1* | 7/2015 | Tsunoda | H03K 5/1252 327/551 |

FOREIGN PATENT DOCUMENTS

| | | |
|---|---|---|
| JP | 2012-256773 | 12/2012 |
| JP | 2013-183147 | 9/2013 |
| JP | 2015-65687 | 4/2015 |
| JP | 2015-139039 | 7/2015 |

OTHER PUBLICATIONS

Brownm Jr., Paul M., A Guide to Analog ASICs, 1992, Academia Press, Inc. pp. 235-236 (Year: 1992).*

RC waveforms, www.electronics-tutorials.ws, 2015 (Year: 2015).*

RC Differentiator, www.electronics-tutorials.ws, Mar. 2017 (Year: 2017).*

Yazaki et al., 25-Gbps x 4 optical transmitter with adjustable asymmetric pre-emphasis in 65-nm CMOS, 2014, IEEE (Year: 2014).*

* cited by examiner

DRIVER CIRCUIT, OPTICAL MODULE, AND ACTIVE OPTICAL CABLE

CROSS-REFERENCE TO RELATED APPLICATION

This application is based upon and claims the benefit of priority of the prior Japanese Patent Application No. 2017-102422, filed on May 24, 2017, the entire contents of which are incorporated herein by reference.

FIELD

The embodiments discussed herein are related to a driver circuit, an optical module, and an active optical cable.

BACKGROUND

In recent years, as a data communication amount increases in a communication field, a data rate has been increased in order to transmit a large amount of data on a single signal path. Through a communication path, not only an electrical signal but also a light signal may be transmitted. High-speed data has a problem that degradation such as, for example, an intersymbol interference occurs in cables, boards, and output devices.

Therefore, a pre-emphasis is performed in which an emphasis signal generating circuit (light emitting device driving circuit) generates an emphasis signal in which a part susceptible to degradation due to the signal intersymbol interference is enhanced in advance by considering deterioration of a signal, and outputs the emphasis signal to a transmission path.

As for an emphasis signal generating circuit that generates the emphasis signal, a finite impulse response (FIR) type emphasis signal generating circuit is known which branches and delays an input signal, and adds and subtracts the input signal and the branched and delayed input signal. A light emitting device such as a laser diode (LD) is driven by, for example, an emphasis signal (driving electrical signal) of which a rising/falling is emphasized, which is generated by the emphasis signal generating circuit to improve an output waveform (light signal).

However, in the related art, various proposals have been made as the light emitting device driving circuit (emphasis signal generating circuit) for driving the light emitting device such as the laser diode (LD).

Related technologies are disclosed in, for example, Japanese Patent Laid-Open Publication Nos. 2012-043933, 2015-139039, 2015-065687, 2012-256773, 2004-273631, and 2013-183147.

SUMMARY

According to an aspect of the invention, a driver circuit configured to drive a light emitting device, the driver circuit includes an asymmetric circuit configured to receive an input signal and include a first capacitor coupled to the input signal and a signal having a fixed electric potential so as to generate a first signal, a delay circuit configured to receive the input signal and delay the input signal so as to generate a second signal, and an adder circuit configured to add the first signal and the second signal so as to generate a drive signal for driving the light emitting device.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

An emphasis signal generating circuit has been proposed to be applied as a light emitting device driving circuit that drives a light emitting device, and as a result, for example, the light emitting device is driven by a driving electrical signal emphasized with a rising/falling to improve the output waveforms.

However, in a light emitting device (LD), for example, rising and falling characteristics are asymmetric due to the relaxation oscillation which is inherent to the light emitting device. Therefore, even when the light emitting device is driven by an emphasis signal, both the rising characteristic and falling characteristic of the output waveform (light signal) may not be improved sufficiently.

Figure 1:
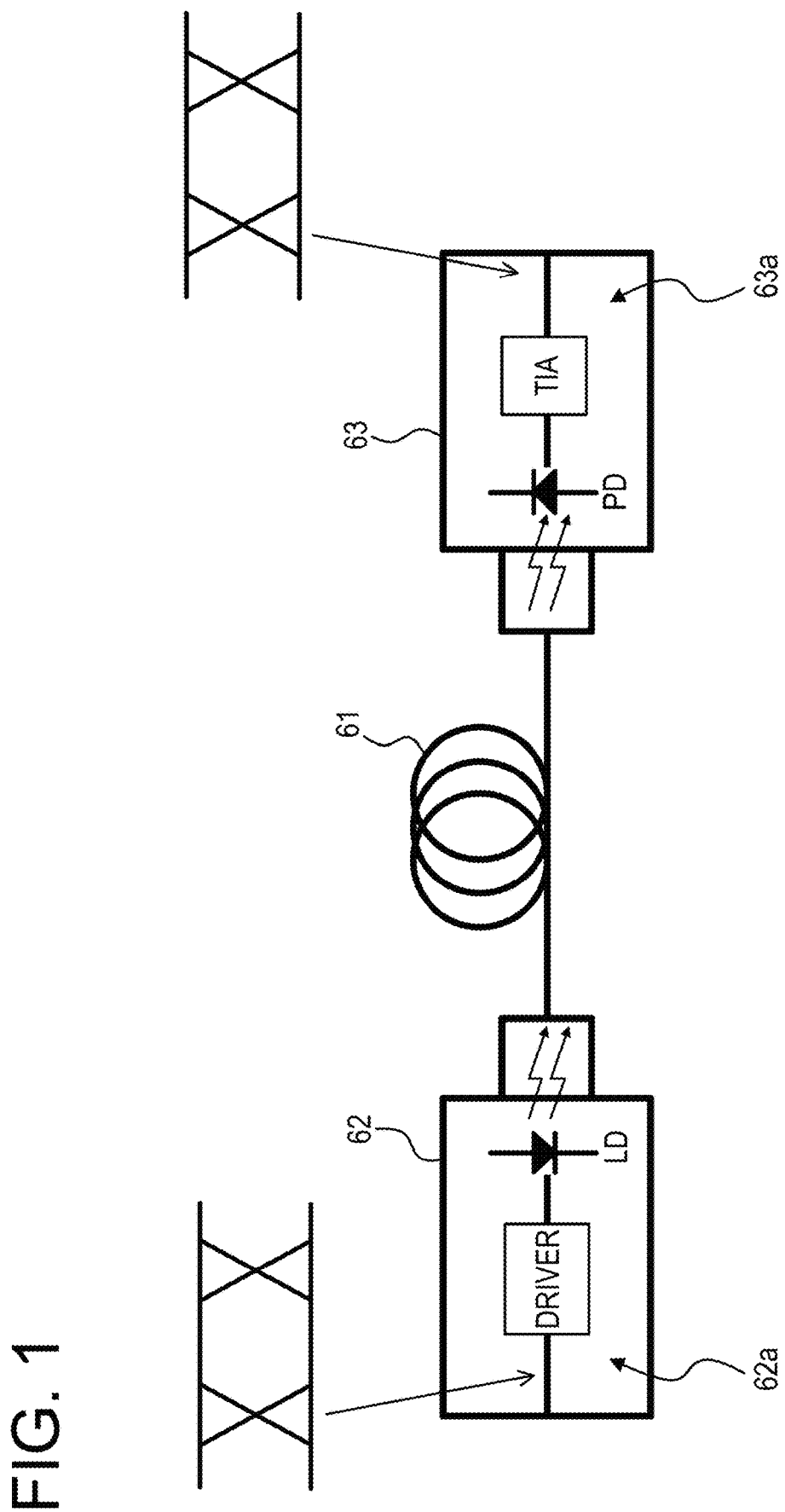
FIG. 1 is a diagram illustrating an example of an active optical cable.

Before describing in detail the embodiments of a light emitting device driving circuit, an optical module, and an active optical cable, an example of the light emitting device driving circuit and problems thereof will be described first with reference to FIG. 1 to FIGS. 3A to 3D. FIG. 1 is a diagram illustrating an example of an active optical cable.

As illustrated in FIG. 1, an active optical cable (AOC) 6 is formed by an optical fiber (optical cable) 61 and plugs (connectors) 62 and 63 provided at both ends of the optical fiber 61. In FIG. 1, the LD denotes a laser diode, the PD denotes a photodiode, and the TIA denotes a trans-impedance amplifier. Herein, the light emitting device driving circuit of the embodiment corresponds to a driver of a light transmitter that drives the LD.

FIG. 1 illustrates that an optical transmitter 62a is provided in the plug 62 and an optical receiver 63a is provided in the plug 63, but the optical transceivers 62a and 63a having functions of both the optical transmitter and the optical receiver are provided in the plugs 62 and 63, respectively. In other words, the optical transceivers (optical modules) 62a and 63a, which perform a conversion of an electrical signal and a light signal, respectively, are provided in the plugs 62 and 63. Herein, as the optical modules 62a and 63a, a transmission/reception IC (one chip IC) may be adopted. Further, the AOC 6 is used for a connection between network devices, a connection between servers, or a connection of a device that handles large-capacity image data to propose products having various transmission speeds and distances.

Figure 2A:
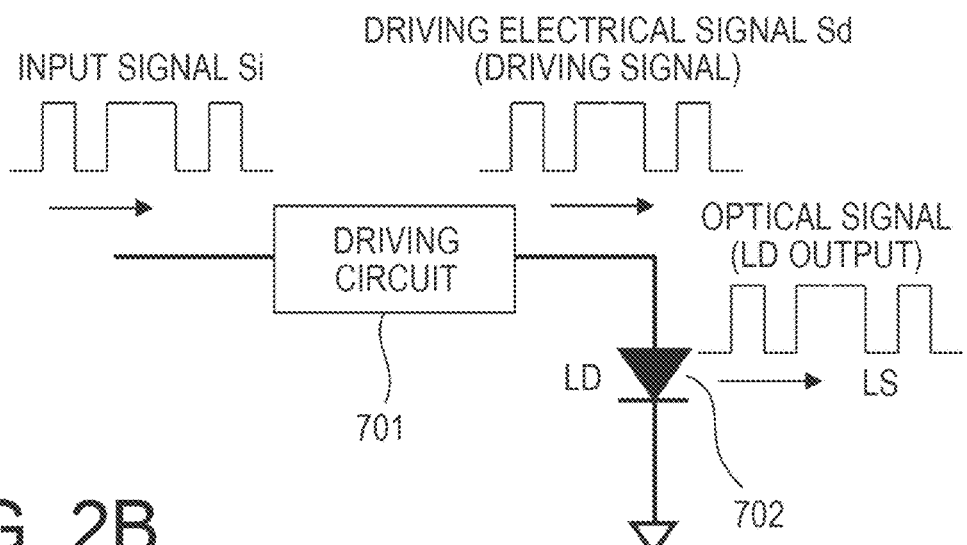
FIGS. 2A to 2C are diagrams for describing driving characteristics by direct modulation of a light emitting device.
Figure 2B:
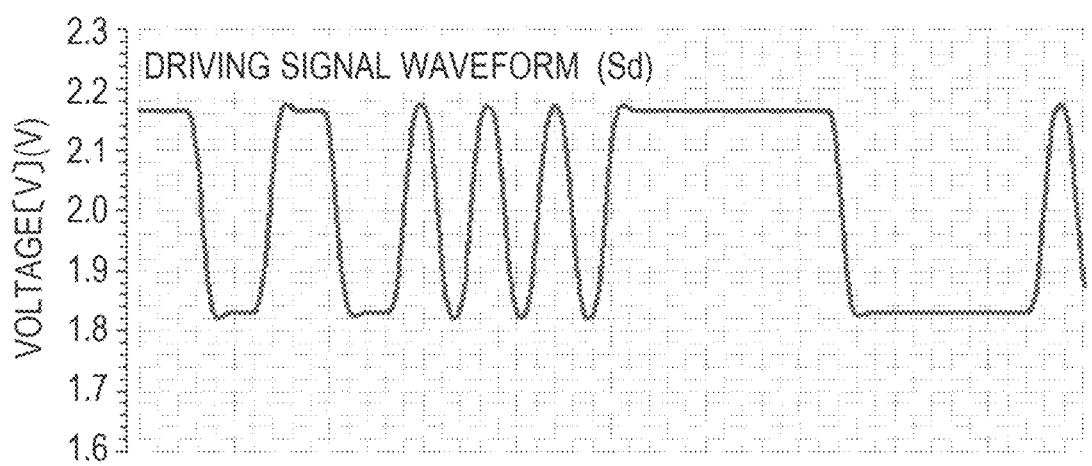
Figure 2C:
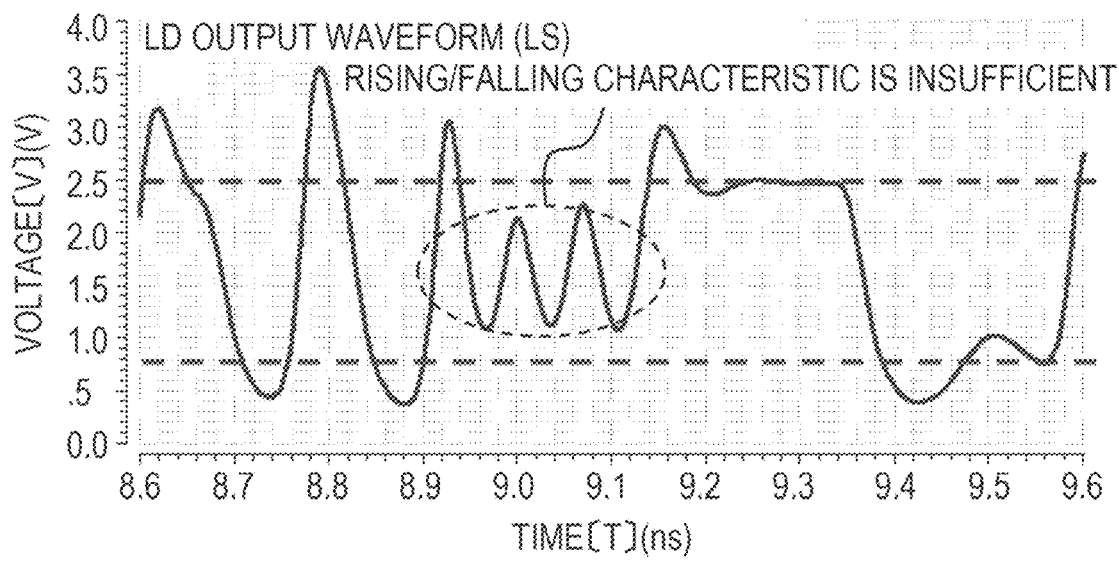

FIGS. 2A to 2C are diagrams for describing driving characteristics by a direct modulation of a light emitting device and illustrate that the laser diode (LD) such as a vertical cavity surface emitting laser (VCSEL) is directly driven by an ON/OFF electrical signal. FIG. 2A illustrates a state where an LD 702 is driven by a driving circuit (light emitting device driving circuit) 701, FIG. 2B illustrates a driving signal waveform (driving electrical signal), and FIG. 2C illustrates an LD output waveform (light signal). Further, reference symbol Si represents an input signal, Sd represents the driving electrical signal (driving signal), and LS represents the light signal (LD output).

As illustrated in FIG. 2A, the driving circuit 701 receives the input signal Si and generates the driving electrical signal Sd to drive the LD 702. The LD 702 performs a light emitting operation based on the driving electrical signal Sd from the driving circuit 701 to output the light signal LS. Herein, the driving circuit 701 is formed, for example, in the optical modules 62a and 63a (light transceiver: transceiving IC) provided in the plugs 62 and 63 of the AOC 6, and the input signal Si corresponds to, for example, an output signal from a network device, a server, or a device that handles large-capacity image data.

As described above, the LD 702 is driven by the driving electrical signal Sd generated by the driving circuit 701 to output the light signal LS. Herein, as apparent from comparison of FIGS. 2B and 2C, a rising/falling characteristic of the LD output waveform LS output from the LD 702 becomes insufficient, for example, when an operation speed of the LD 702 is low with respect to the driving signal waveform Sd input in the LD 702. That is, an amplitude of the LD output waveform becomes smaller with respect to a high-speed input signal.

FIGS. 3A to 3D are diagrams for describing an example of a light emitting device driving circuit and are used for describing an example of driving the light emitting device by the emphasis signal. In FIGS. 3A to 3D, reference numeral 801 represents the light emitting device driving circuit, reference numeral 802 represents the light emitting device, reference numeral 811 represents a delay unit, reference numerals 812 and 813 represent amplifying units (amplifiers), and reference numeral 814 represents an adding/subtracting unit (adding circuit).

Figure 3A:
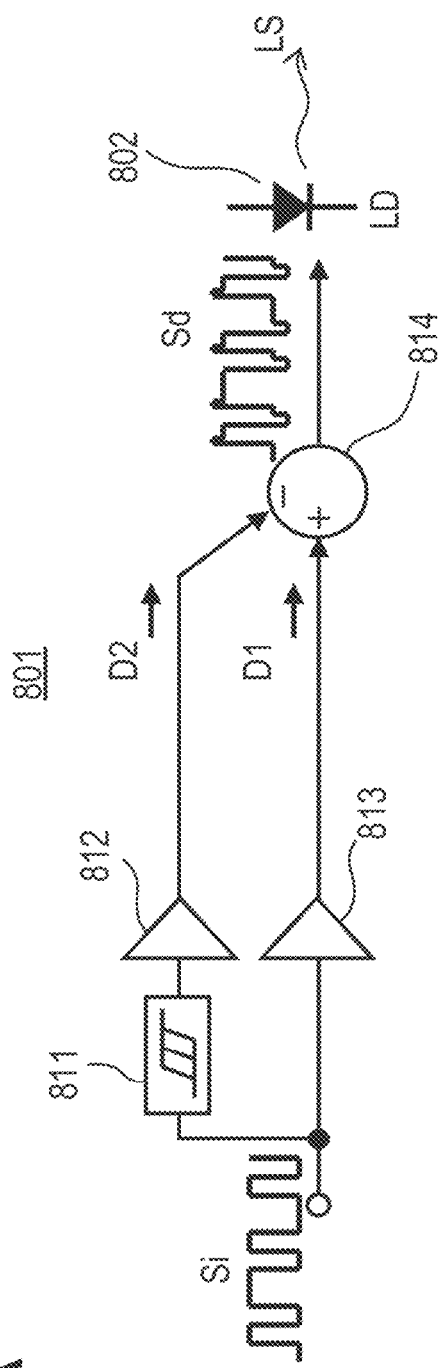
FIGS. 3A to 3D are diagrams for describing an example of a light emitting device driving circuit.
Figure 3B:
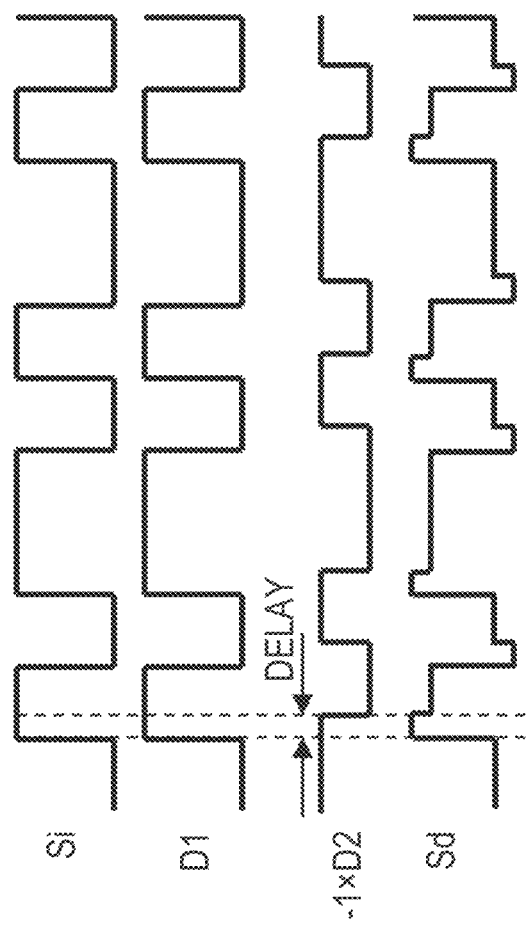
Figure 3C:
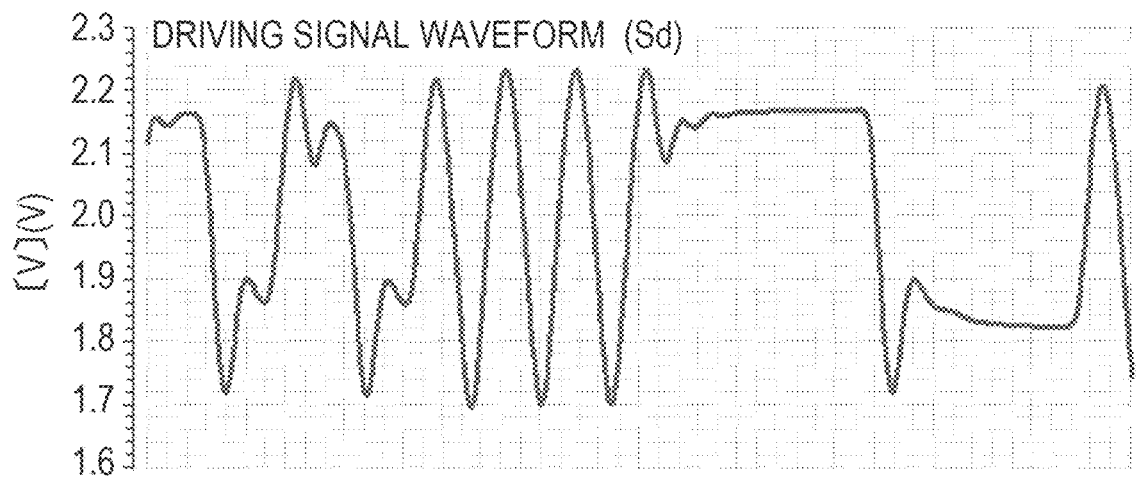
Figure 3D:
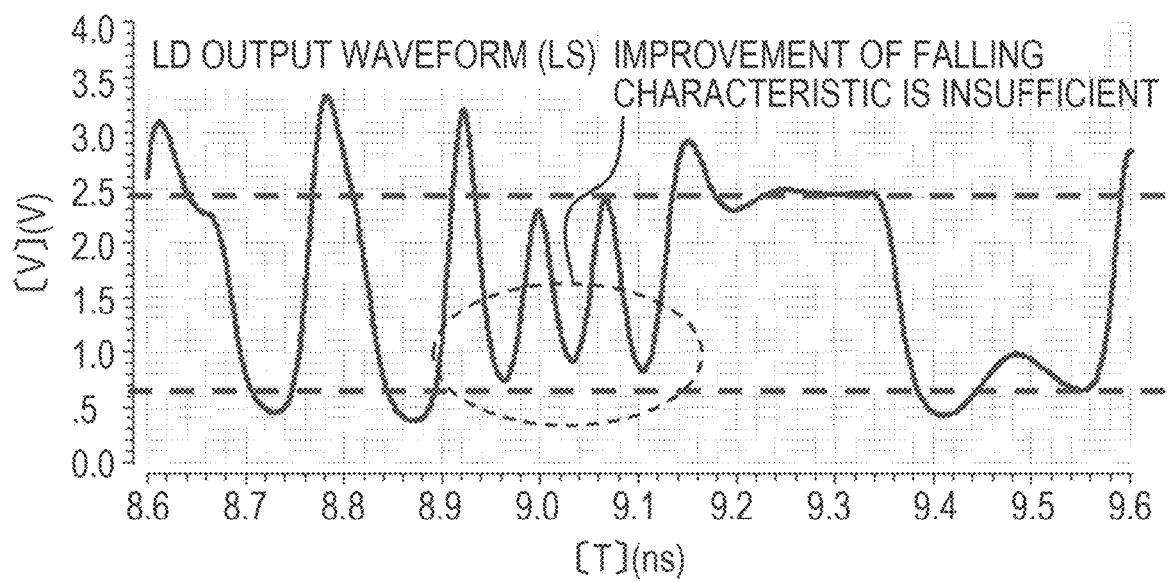

Herein, FIG. 3A schematically illustrates a configuration for driving a light emitting device (the LD such as the VCSEL) 802 by the emphasis signal (driving electrical signal) Sd generated by a light emitting device driving circuit (emphasis signal generating circuit) 801. Further, FIG. 3B illustrates each signal in the light emitting device driving circuit 801 illustrated in FIG. 3A. In addition, FIG. 3C illustrates the driving signal waveform Sd by the light emitting device driving circuit 801 illustrated in FIG. 3A, and FIG. 3D illustrates the LD output waveform LS.

The light emitting device driving circuit 801 illustrated in FIG. 3A is an example of an FIR type emphasis signal generating circuit and is configured to generate the emphasis signal Sd from a main data signal D1 and a delayed branch data signal D2. The light emitting device driving circuit 801 branches the main data signal D1 obtained by amplifying the input signal Si by the amplifier 813 and the input signal Si and delays the branched main data signal D1 and input signal Si by the delay unit 811. Thereafter, the light emitting device driving circuit 801 adds (subtracts) the branched data signal D2 amplified by the amplifier 812 by the adding circuit 814 to generate the driving electrical signal Sd. That is, the branched data signal D2 is input to a subtracting terminal of the adding circuit 814 and the main data signal D1 is input in an adding terminal of the adding circuit 814.

That is, as illustrated in FIG. 3B, the driving electrical signal Sd becomes the emphasis signal of which rising/falling is emphasized as the main data signal D1 and the branched data signal D2 are added/subtracted by the adding circuit 814. The LD 802 such as the VCSEL is driven by the emphasis signal Sd. In addition, as apparent from the comparison of FIGS. 3C and 3D and FIGS. 2B and 2C, the LD 801 is driven by the emphasis signal (driving electrical signal Sd) of which rising/falling is emphasized to improve the LD output waveform LS. Further, an intensity of emphasis may be adjusted by, for example, an addition ratio (addition/subtraction ratio) in the adding circuit 814.

However, in addition to the VCSEL, and the rising and falling characteristics of the LD output waveform LS become asymmetric due to the relaxation oscillation which is inherent to the LD 802. That is, as illustrated in FIG. 3D, even when the LD 801 is driven by the emphasis signal Sd in FIG. 3C, for example, improvement of the rising characteristic of the LD output waveform LS may be insufficient in spite of sufficient improvement of the rising characteristic thereof.

Hereinafter, embodiments of a light emitting device driving circuit, an optical module, and an active optical cable capable of generating a driving electrical signal that compensates for asymmetrical light emitting characteristics of a light emitting device will be described in detail with reference to the accompanying drawings.

First Embodiment

Figure 4A:
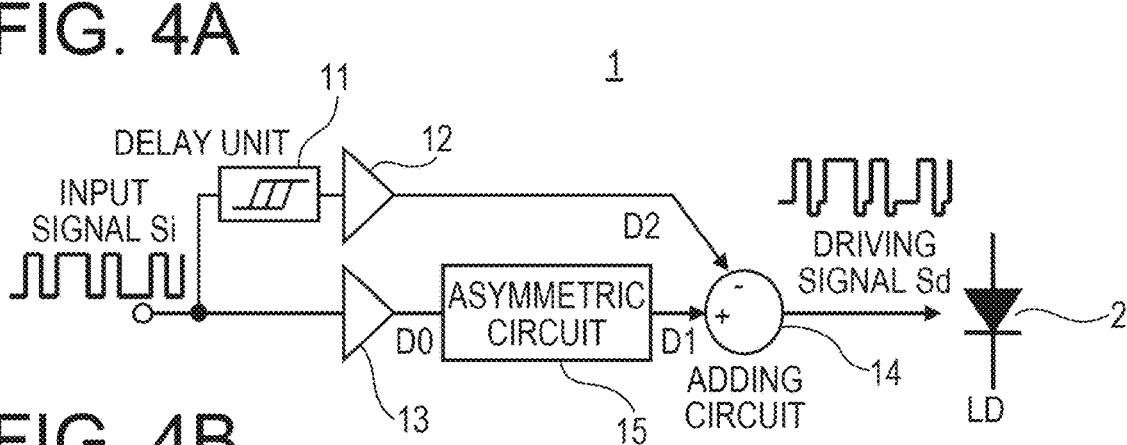
FIGS. 4A to 4C are diagrams for describing a first embodiment of the light emitting device driving circuit.
Figure 4B:
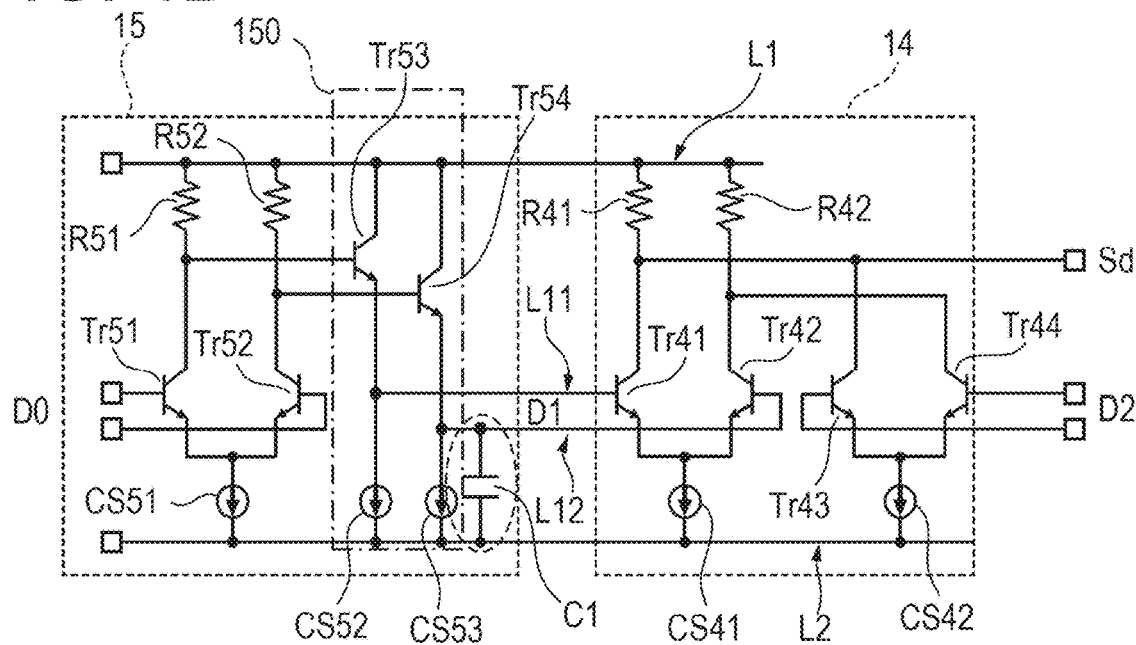
Figure 4C:
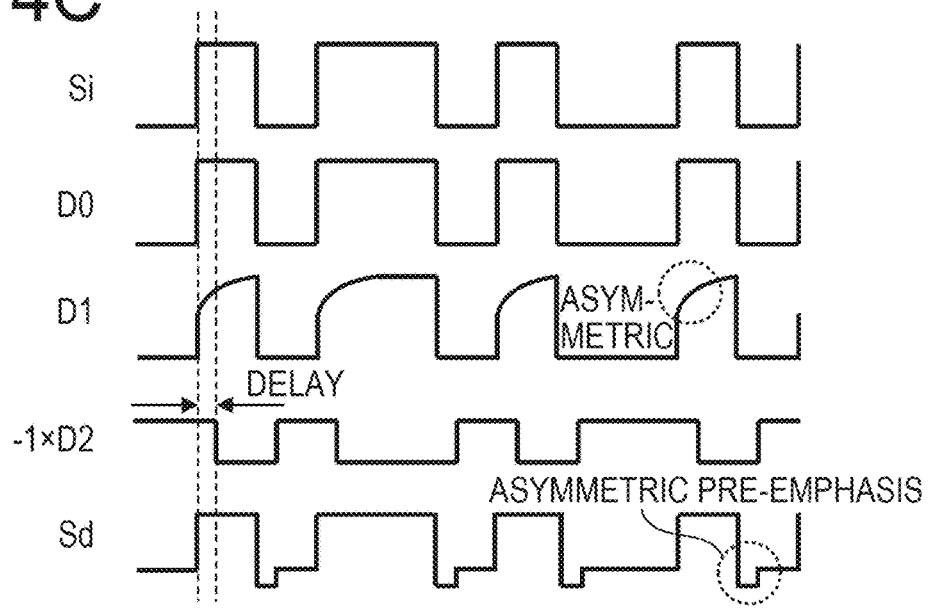

FIGS. 4A to 4C are diagrams for describing a first embodiment of the light emitting device driving circuit. In FIGS. 4A to 4C, reference numeral 1 represents a light emitting device driving circuit, reference numeral 2 represents a light emitting device, reference numeral 11 represents a delay unit, reference numerals 12 and 13 represent amplifying units (amplifiers), reference numeral 14 represents an adding/subtracting unit (adding circuit), and reference numeral 15 represents an asymmetric circuit.

Herein, FIG. 4A schematically illustrates a configuration for driving a light emitting device (e.g., an LD such as the VCSEL) 2 by the emphasis signal (driving electrical signal) Sd generated by a light emitting device driving circuit 1 (emphasis signal generating circuit) 2. Further, FIG. 4B illustrates a circuit configuration of an example of the adding circuit 14 and the asymmetric circuit 15 in the light emitting device driving circuit 1 illustrated in FIG. 4A, and FIG. 4C illustrates each signal in the light emitting device driving circuit 1 illustrated in FIG. 4A.

As apparent from the comparison between FIG. 4A and FIG. 3A described above, in the light emitting device driving circuit 1 of the first embodiment, the asymmetric circuit 15 is provided between the amplifier 813 and the adding circuit 814 in the light emitting device driving circuit 801 illustrated in FIG. 3A. Further, the light emitting device driving circuit 1 of the first embodiment is the FIR type emphasis signal generating circuit similarly to the light emitting device driving circuit 801 illustrated in FIG. 3A and is configured to generate the emphasis signal Sd by the main data signal D1 and the delayed branched data signal D2.

That is, as illustrated in FIG. 4A, the light emitting device driving circuit 1 of the first embodiment processes a data signal D0 obtained by amplifying the input signal Si by means of the amplifier (first amplifier) 13 in the asymmetric circuit 15 and sets the processed data signal D0 as the main data signal D1. Further, after the input signal Si is branched and delayed by the delay unit 11, a branched data signal D2 amplified by the amplifier (second amplifier) 12 and the main data signal D1 which is an output of the asymmetric circuit 15 are added (added/subtracted) by the adding circuit 14 to generate the driving electrical signal (emphasis signal) Sd. That is, the main data signal D1 is input in the adding terminal (first terminal) of the adding circuit 14 and the branched data signal D2 is input in the subtracting terminal (second terminal) of the adding circuit 14. Herein, the asymmetric circuit 15 operates with a differential signal and for example, connects a capacitor between one signal line (e.g., an output signal line of the emitter follower) for outputting differential main data signals D1 and/D1 and a fixed potential point (e.g., a ground potential line and a second power supply line).

As described above, FIG. 4B illustrates a circuit configuration of an example of the adding circuit 14 and the asymmetric circuit 15 in the light emitting device driving circuit 1 illustrated in FIG. 4A and illustrates that the circuit configuration is formed by an npn bipolar transistor. Further, in application of the embodiment, the circuit configuration is not particularly formed by the npn bipolar transistor and a pnp bipolar transistor, an n or p channel type MOS transistor, or various compound semiconductors may be applied, of course.

As illustrated in FIG. 4B, the asymmetric circuit 15 includes resistors R51 and R52, npn bipolar transistors Tr51 to Tr54, and current sources CS51 to CS53. One end of each of the resistors R51 and R52 is connected to a first power supply line (high-potential power supply line) L1 and the other end of the resistor R51 is connected to a collector of the transistor Tr51 and connected to a base of the transistor Tr53. Similarly, the other end of the resistor R52 is connected to the collector of the transistor Tr52 and connected to the base of the transistor Tr54.

The emitters of the transistors Tr51 and Tr52 are commonly connected and connected to a power supply line (low-potential power supply line) L2 through the current source CS51. Further, the emitter of the transistor Tr53 is connected to the second power supply line L2 through the current source CS52 and connected to the base of a transistor Tr41 (to be described later). Further, the emitter of the transistor Tr54 is connected to the second power supply line L2 and the base of a transistor Tr42 (to be described later) through the current source CS53 and a capacitor C1.

Herein, the transistors Tr53 and TR54 and the current sources CS52 and CS53 form an emitter follower unit 150 and the main data signal D1 is extracted from signal lines L11 and L12 as emitter follower outputs of the transistors Tr53 and Tr54. Further, the main data signal D1 becomes the differential signal D1 or /D1 and in FIG. 4B, the main data signal D1 is configured to connect the capacitor C1 between the signal line L12 which is the emitter follower output of the transistor Tr54 and the second power supply line L2 (fixed potential point).

The adding circuit 14 includes resistors R41 and R42, transistors Tr41 to Tr44, and current sources CS41 and CS42. One end of each of the resistors R41 and R42 is connected to the first power supply line L1 and the other end of the resistor R41 is connected to the collectors of the transistors Tr41 and Tr43 and the driving electrical signal (emphasis signal) Sd is configured to be extracted. The other end of the resistor R42 is connected to the collectors of the transistors Tr42 and Tr44.

The emitters of the transistors Tr41 and Tr42 are commonly connected and connected to the second power supply line L2 through the current source CS41 and similarly, the emitters of the transistors Tr43 and Tr44 are commonly connected and connected to the second power supply line L2 through the current source CS42. Further, the main data signal D1 (differential signals D1 or /D1) from the asymmetric circuit 15 is input in the bases of the transistors Tr41 and Tr42 and the branched data signal D2 (differential signal D2 or /D2) is input in the bases of the transistors Tr43 and Tr44 so that addition and subtraction are performed.

In the light emitting device driving circuit 1 of the first embodiment, the output signal D0 of the amplifier 13 corresponding to the output signal (the signal D1 of FIG. 3B) of the amplifier 813 illustrated in FIG. 3A described above is processed by the asymmetric circuit 15 to generate the main data signal D1. That is, as apparent from the comparison between FIG. 4C and FIG. 3B described above, since the main data signal D1 in the light emitting device driving circuit 1 of the first embodiment connects the signal line L12 and the second power supply line L2 by the capacitor C1, a rising edge of the main data signal D1 is gradually changed. The main data signal D1 of which the rising edge is gradually changed and the branched data signal D2 (the same as D2 of FIG. 3A) are added/subtracted by the adding circuit 14 to generate the asymmetric driving electrical signal (emphasis signal) Sd illustrated in FIG. 4C. Further, falling of the driving electrical signal Sd illustrated in FIG. 4C is configured to be enhanced (emphasized) more than falling.

That is, in the light emitting device driving circuit 1 of the first embodiment, the falling signal greatly deteriorates as compared with the rising signal at the time of direct modulation of the light emitting device (LD) 2, so that a signal in which only falling is enhanced is generated (pre-emphasis generated) in advance. As described above, in the first embodiment, in a pre-emphasis generation method of adding/subtracting a delay signal, the capacitor (asymmetric generation capacitor) C1 for generating asymmetry of rising and falling of the signal is added to a partial circuit (e.g., the emitter follower unit 150) of a signal path. In addition, by adding/subtracting the rising and falling asymmetric signal (main data signal D1) and the branched data signal D2 by the adding circuit 14 in a subsequent stage, for example, the pre-emphasis signal Sd with the enhanced falling is generated.

Figure 5A:
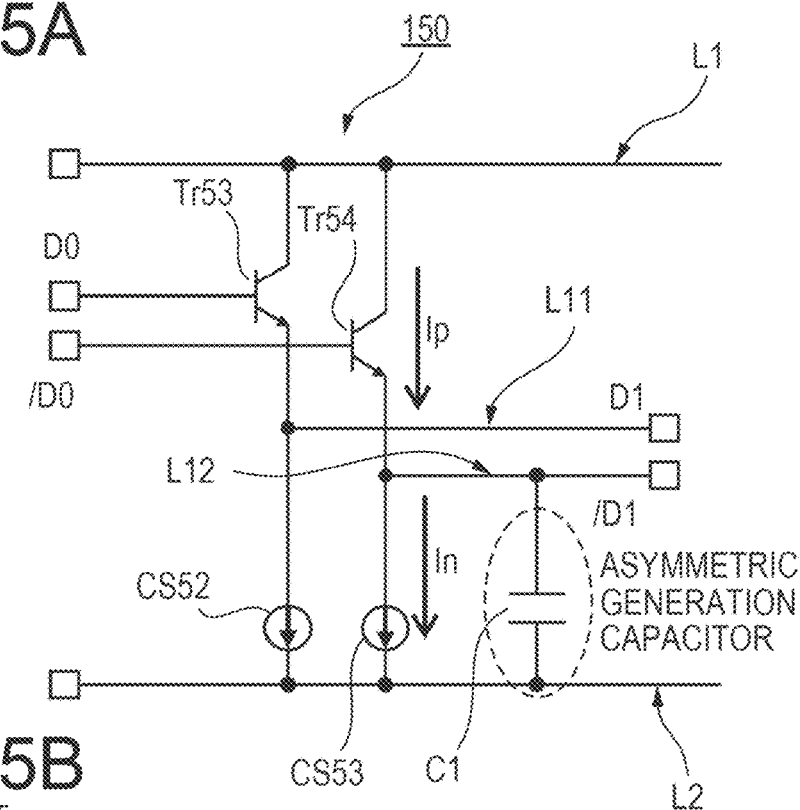
FIGS. 5A and 5B are diagrams for describing characteristics of an emitter follower portion in the light emitting device driving circuit illustrated in FIGS. 4A to 4C.
Figure 5B:
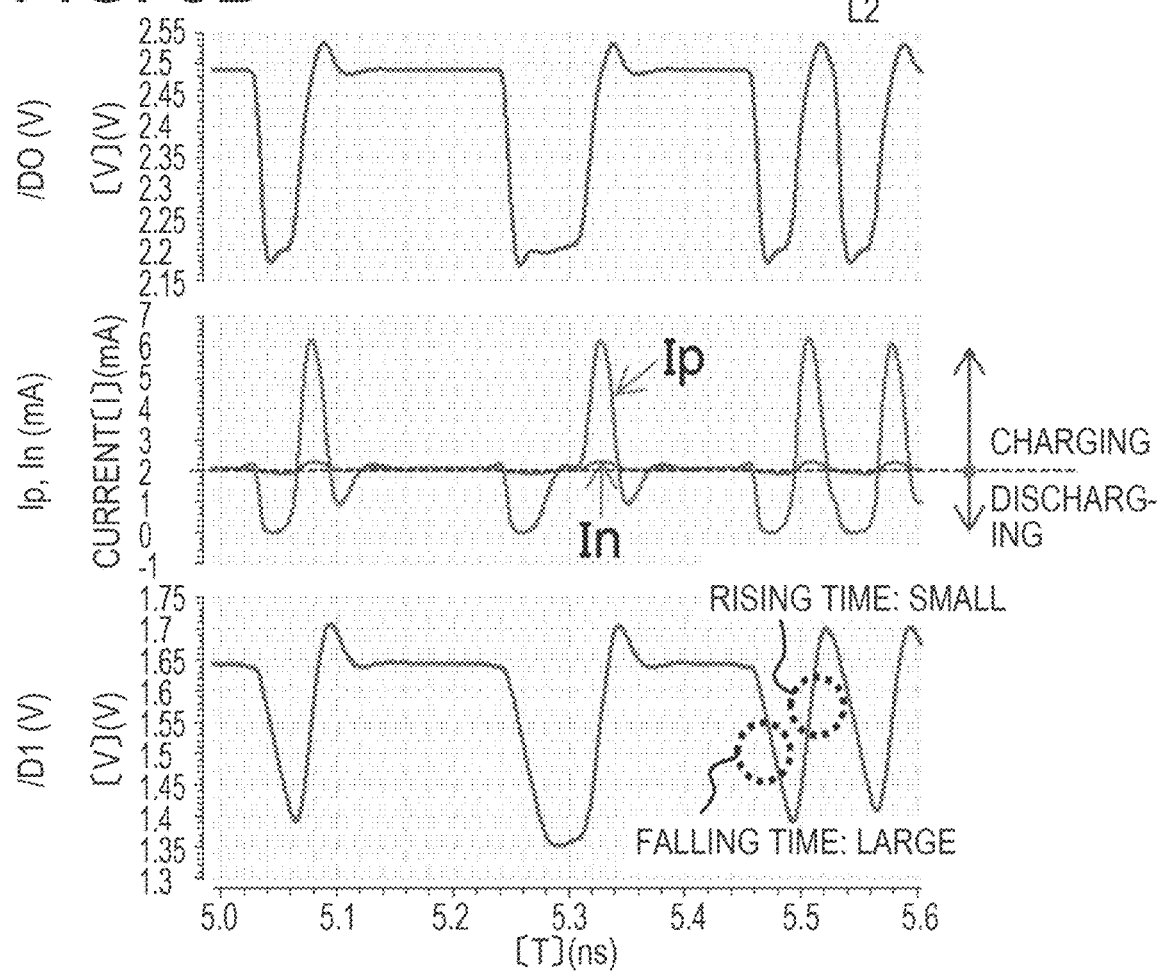

FIGS. 5A and 5B to FIGS. 7A and 7B are diagrams for describing characteristics of the emitter follower unit in the light emitting device driving circuit illustrated in FIGS. 4A to 4C. First, FIG. 5A to 4C extracts and illustrates the emitter follower unit 150 and the capacitor C1 in FIG. 4A, and FIG. 5B illustrates an operation (a simulation waveform of each signal) of the emitter follower unit 150 illustrated in FIG.

5A. Further, in FIGS. 5A and 5B, each of reference symbols D0 or /D0 and D1 or /D1 denotes the differential signal and the signals /D0 and/D1 represent inverse-phase signals of the signals D0 and D1. In addition, the capacitor (asymmetric generation capacitor) C1 is connected between the signal line (signal path) L12 connected to the emitter of the transistor Tr54 and the second power supply line L2.

However, with respect to the collector-emitter current Ip and In of the bipolar transistor Tr54, Equation (1) below is established. Herein, $I_C$ represents collector current $I_S$, $V_T$ represents a constant, and $V_{BE}$ represents a base-emitter voltage.

$$I_C = I_S \exp V_{BE}/V_T \quad (1)$$

That is, when the data signal (output signal of the amplifier 13) D0 is changed from a low level "L" to a high level "H", since base-emitter voltage $V_{BE}$ increases due to a bipolar with respect to the current Ip in which electrical charges are accumulated (charged) in the capacitor C1, charging current Ip (=$I_C$) increases. Herein, as a capacitance value of the capacitor C1 increases, a time during which the charging current Ip increases in conjunction with $V_{BE}$ becomes longer, and as a result, an increase in a rising time due to the increase in capacitance becomes smaller.

Meanwhile, when the data signal D0 is changed from "H" to "L", the current (discharge current) In discharging the electrical charge accumulated in the capacitor C1 is always constant due to the current source, and therefore, the increase in falling time becomes larger in proportion to the capacitance. This is applied to the inverse-phase signal (data signal) /D0, and as a result, the asymmetric inverse signal (main data signal) /D1 in which the rising time is substantially large and the falling time is substantially small is generated by a difference between the charging current Ip and a discharged flow rate In as illustrated in FIG. 5B.

Next, with reference to FIGS. 6A and 6B, in the emitter follower unit 150 and the capacitor C1 illustrated in FIG. 5A, a relationship of a capacitance size (capacitance value) of the capacitor (asymmetric generation capacitor) C1, and the charging/discharging currents Ip and In will be described. Herein, FIG. 6A illustrates the simulation waveforms of charging/discharging currents Ip and In illustrated in a middle end of FIG. 5B with respect to the size of C1, and FIG. 6B illustrates the simulation waveform of the generated inverse-phase signal /D1 illustrated in a lower part of FIG. 5B for the size of C1.

Figure 6A:
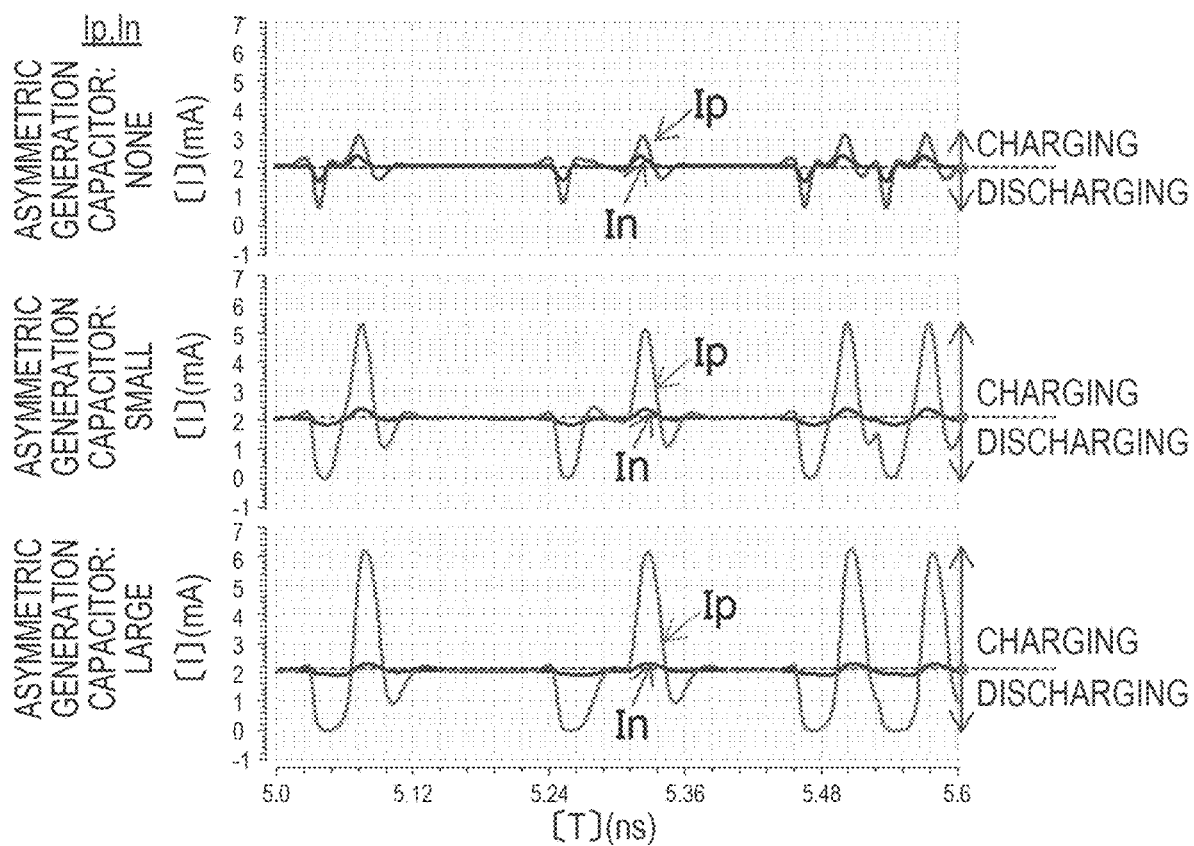
FIGS. 6A and 6B are diagrams for describing characteristics of an emitter follower portion in the light emitting device driving circuit illustrated in FIGS. 4A to 4C.
Figure 6B:
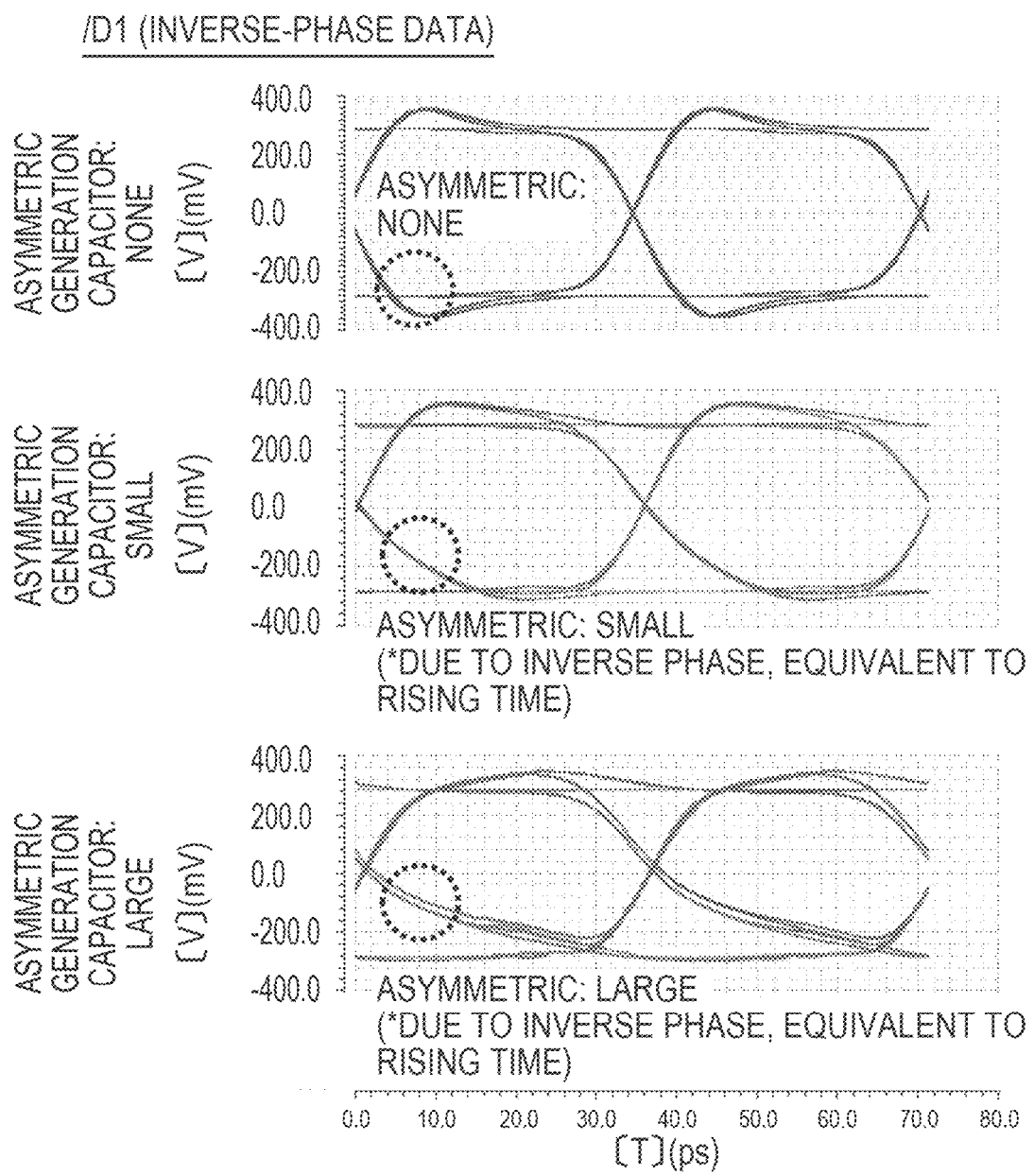

An upper end of each of FIGS. 6A and 6B shows a case where the asymmetric generation capacitor C1 is not provided, a middle end of each of FIGS. 6A and 6B shows a case where C1 is small, and a lower end of each of FIGS. 6A and 6B shows a case where C1 is large. As apparent from the comparison of the waveforms of the upper end, the middle end, and the lower end in FIG. 6A, when the size of the capacitor C1 increases, the charging current Ip also increases in conjunction with the increase in size of the capacitor C1 and an increase amount of the discharged current In becomes relatively smaller. As a result, as apparent from the comparison of the waveforms of the upper end, the middle end, and the lower end in FIG. 6B, dependence of the rising time of the inverse-phase main data signal (inverse-phase data) /D1 on the capacitance size becomes smaller, but the dependence of the falling time on the capacitance size becomes larger. That is, it may be seen that rising and falling asymmetry of the inverse-phase data /D1 increases depending on the capacitance size.

Figure 7A:
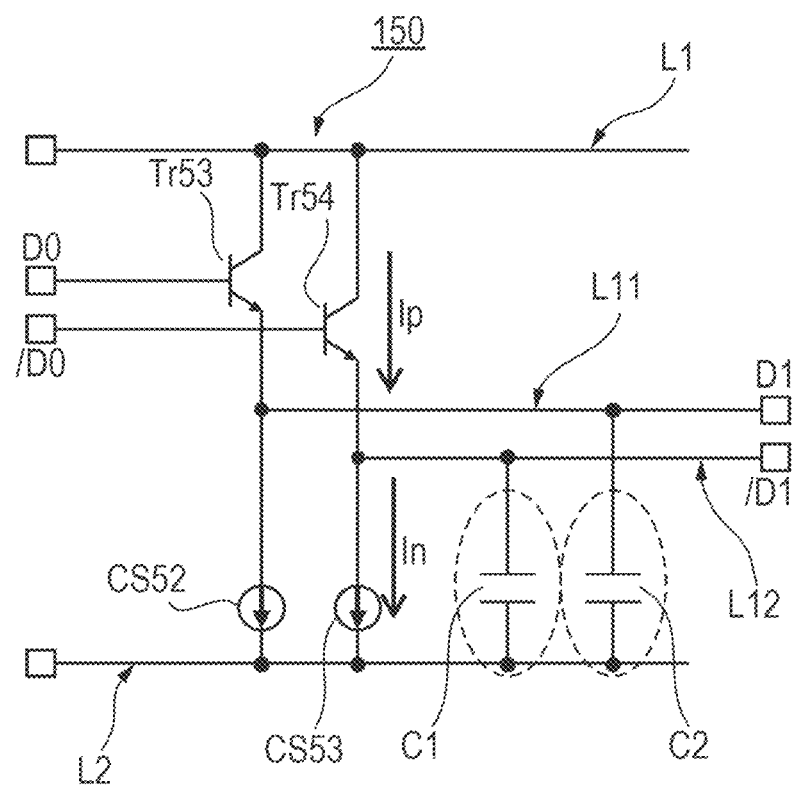
FIGS. 7A and 7B are diagrams for describing characteristics of an emitter follower portion in the light emitting device driving circuit illustrated in FIGS. 4A to 4C.
Figure 7B:
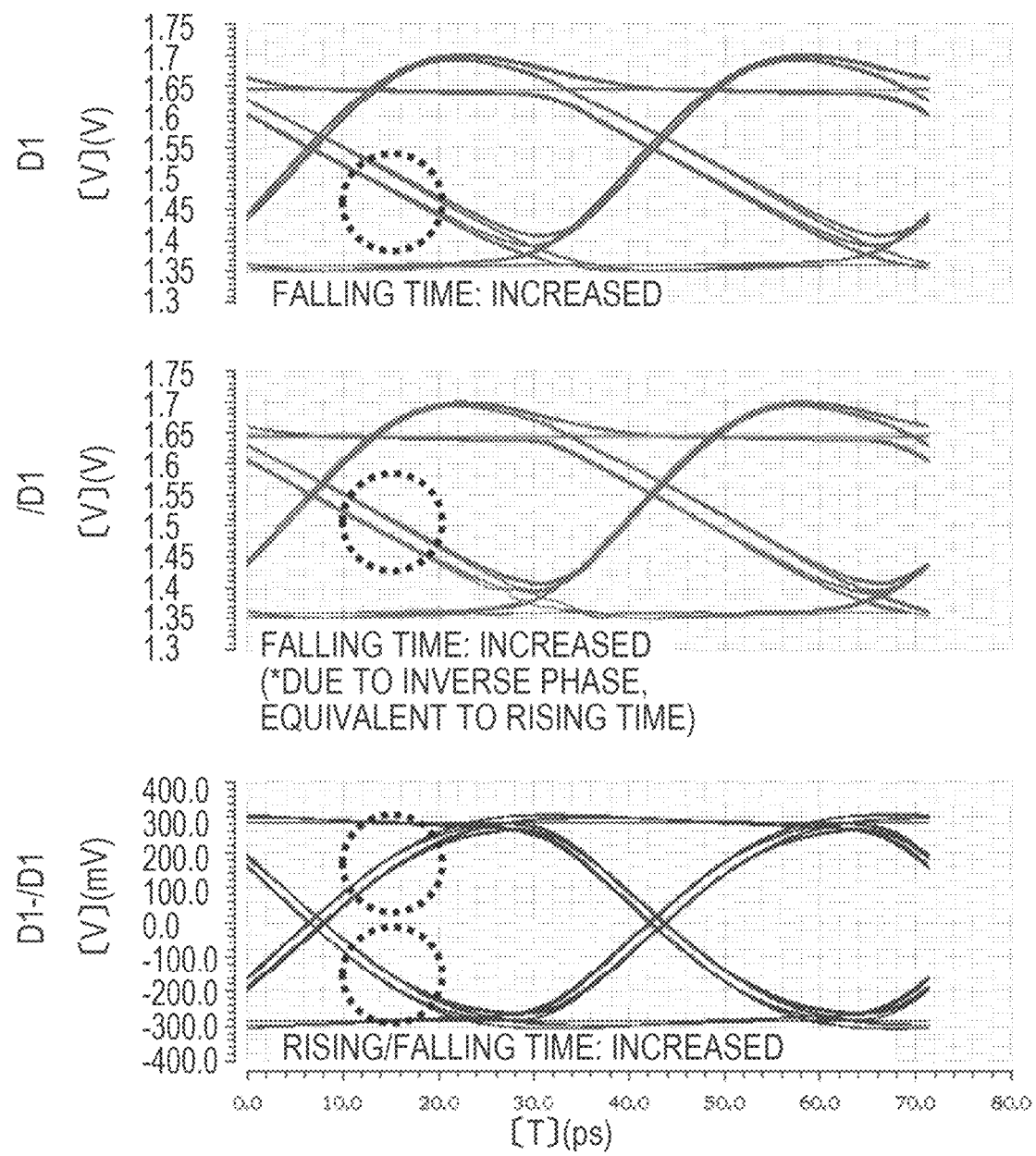

FIGS. 7A and 7B are used for describing a case where the capacitors C1 and C2 are provided (connected) between the signal lines L11 and L12 connected to the emitter of each of the transistors Tr53 and Tr54 and the second power supply line L2, respectively, for comparison. Herein, FIG. 7A corresponds to the above-mentioned FIG. 5A described above and FIG. 7B illustrates the operation (the simulation waveforms of the signals D1, /D1, and D1-/D1) of the emitter follower unit 150 illustrated in FIG. 7A. Further, it is assumed that the capacitance values of the capacitors C1 and C2 are the same as each other.

As illustrated in FIG. 7A, when the capacitor C1 is provided between the signal line L12 and the second power supply line L2 and the capacitor C2 having the same value as the capacitor C1 is provided between the signal line L11 and the second power supply line L2, each signal waveform is illustrated in FIG. 7B.

That is, when the capacitors C1 and C2 having the same value are provided in both signal lines L11 and L12 of the differential signal of the emitter follower unit 150, both the signals (normal) D1 and (inverse-phase) /D1 become asymmetric waveforms in which only the falling time increases by C1 and C2. Herein, since the signal /D1 is the inverse-phase signal of the signal D1, the signal /D1 has a characteristic equivalent to the case where the rising time of the signal D1 increases. As a result, when the signal D1-/D1 is considered, the signal D1-/D1 has a symmetric waveform in which both the rising time and the falling time both increase.

As described above, it may be seen that even when the capacitors C2 and C1 having the same value are provided in the signal lines L11 and L12 connected to the emitters of both the transistors Tr53 and Tr54 of the emitter follower unit 150, it is difficult to obtain the signal (emphasis signal) having the asymmetric characteristic.

Figures 8A, 8B:
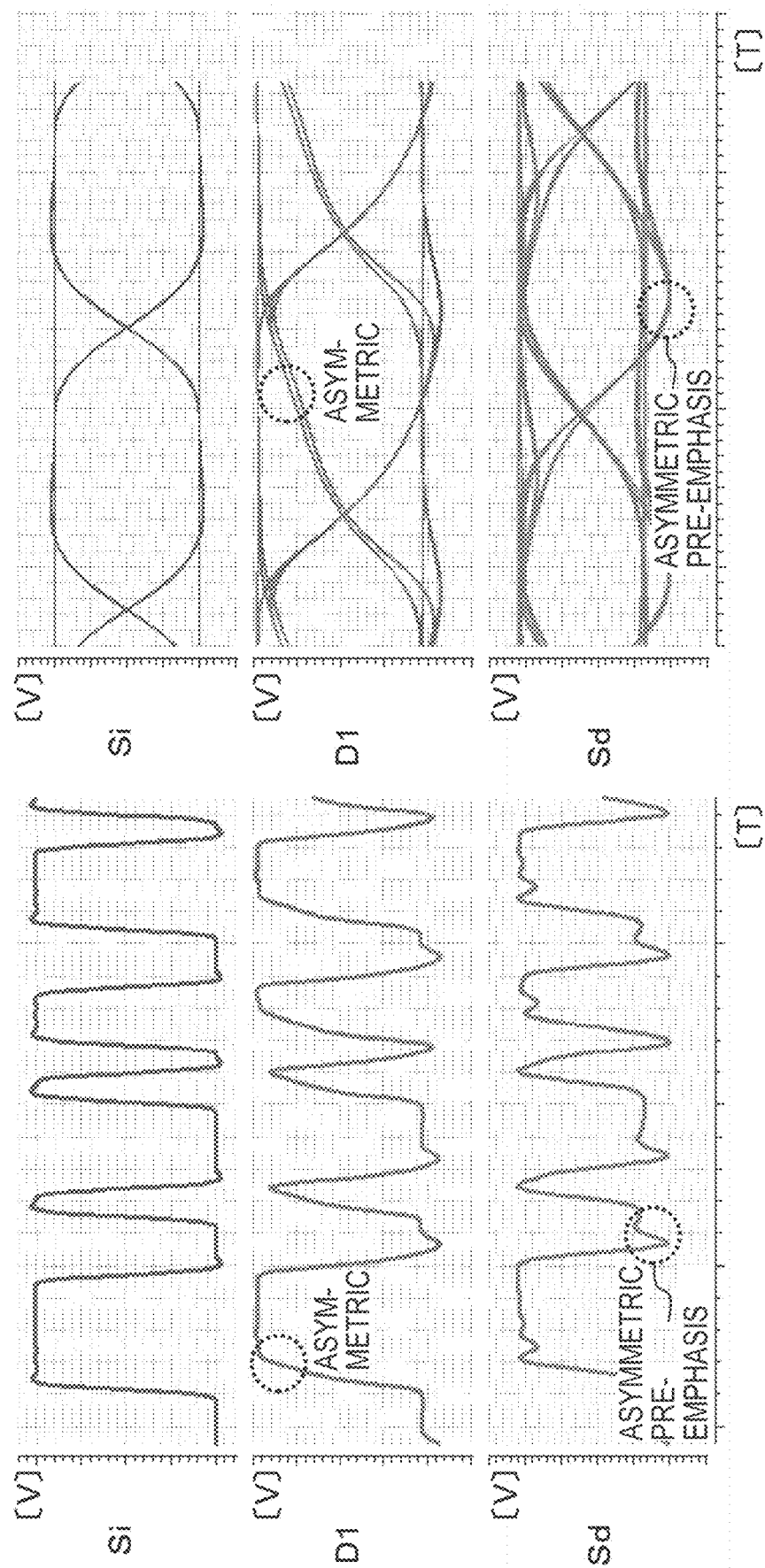
FIGS. 8A and 8B are diagrams illustrating a simulation waveform of the light emitting device driving circuit shown in FIGS. 4A to 4C.

FIGS. 8A and 8B are diagrams illustrating a simulation waveform of the light emitting device driving circuit illustrated in FIGS. 4A to 4C. FIG. 8A illustrates time waveforms of the input signal Si, the main data signal D1, and the driving electrical signal Sd, and FIG. 8B illustrates I-waveforms of Si, D1, and Sd. As illustrated in FIGS. 8A and 8B, for example, as illustrated in FIG. 4B, the asymmetric generation capacitor C1 is connected between the signal path (signal line) L12 of the main data signal D1 and the second power supply line L2, and as a result, an asymmetric part (asymmetric point) is included in the main data signal D1. An asymmetric pre-emphasis is generated in the driving signal Sd based on the asymmetric part of D1.

As described with reference to FIGS. 4A to 4C, the branched data signal D2 is added to/subtracted from the main data signal D1 having the asymmetric part by the adding circuit 14 to generate, for example, the driving signal (pre-emphasis signal) Sd in which falling is enhanced.

Figure 9:
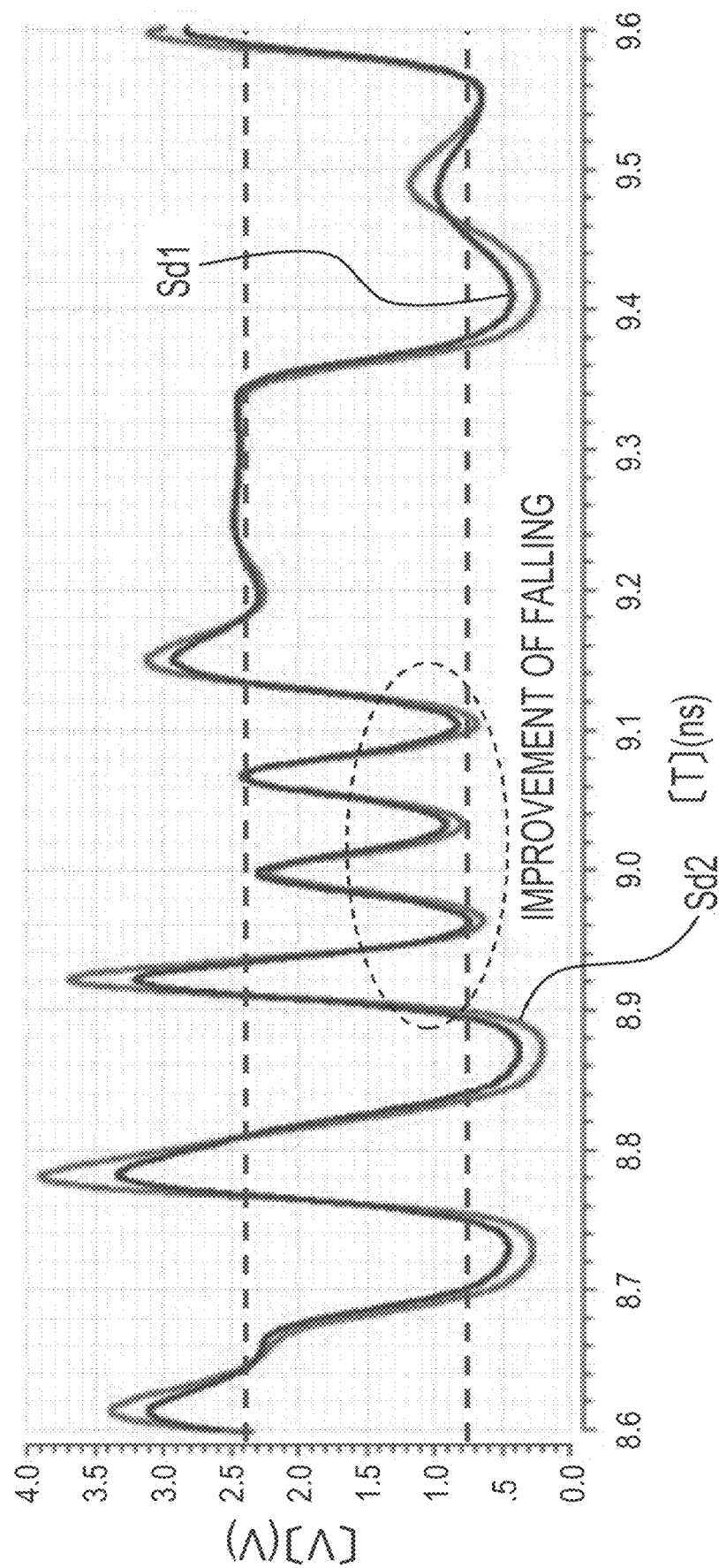
FIG. 9 is a diagram comparing and illustrating the simulation waveform of an output of the light emitting device driven by the light emitting device driving circuit illustrated in FIGS. 3A to 3D and FIGS. 4A to 4C.

FIG. 9 is a diagram comparing and illustrating the simulation waveform of the driving signal generated by the light emitting device driving circuit illustrated in FIGS. 3A to 3D and FIGS. 4A and 4C. Herein, reference numeral Sd1 represents a driving signal waveform generated by the light emitting device driving circuit 801 illustrated in FIG. 3A, and reference numeral Sd2 represents the driving signal waveform generated by the light emitting device driving circuit 1 illustrated in FIG. 4A.

As apparent from FIG. 9, it may be seen that the driving signal waveform Sd2 by the light emitting device driving circuit 1 of the first embodiment is more remarkable in enhancement of falling than the drive signal waveform Sd1 by the light emitting device driving circuit 801 of FIGS. 3A to 3D that does not include the asymmetric generation capacitor C. By driving the light emitting device (LD) 2 by the driving signal waveform Sd2 generated by the light emitting device driving circuit 1 of the first embodiment, it is possible to sufficiently drive the light emitting device 2 having the asymmetric rising and falling characteristics (asymmetric light emitting characteristic).

In the above description, the description has been given based on the correction (compensation) of the falling characteristic in the laser diode such as the VCSEL, but the driving signal waveform may be widely applied to the correction of the asymmetric light emitting characteristic of the light emitting device. In other words, for example, the installation point or size of the asymmetric generation capacitor C1 and an adding or subtracting method by the adding circuit 14 may be variously changed and modified according to the asymmetric light emitting characteristic of the light emitting device 2. Further, although an example in which the bipolar transistor is applied as the light emitting device driving circuit 1 has been described, a metal-oxide-semiconductor (MOS) transistor or a compound semiconductor may be applied, of course.

Second Embodiment

Figure 10A:
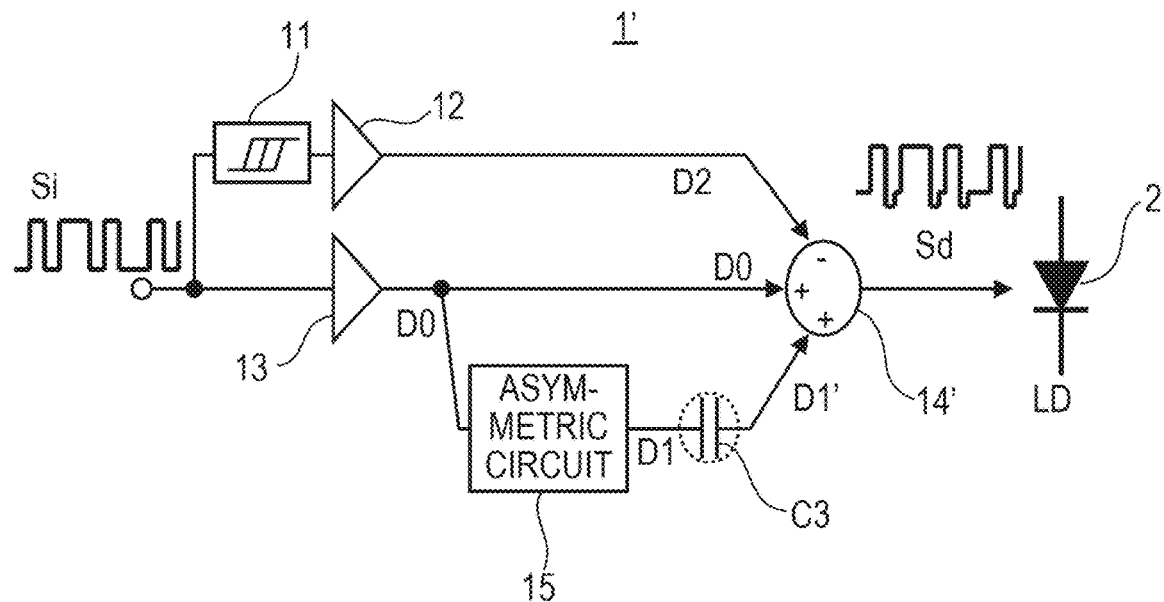
FIGS. 10A and 10B are diagrams for describing a second embodiment of a light emitting device driving circuit.
Figure 10B:
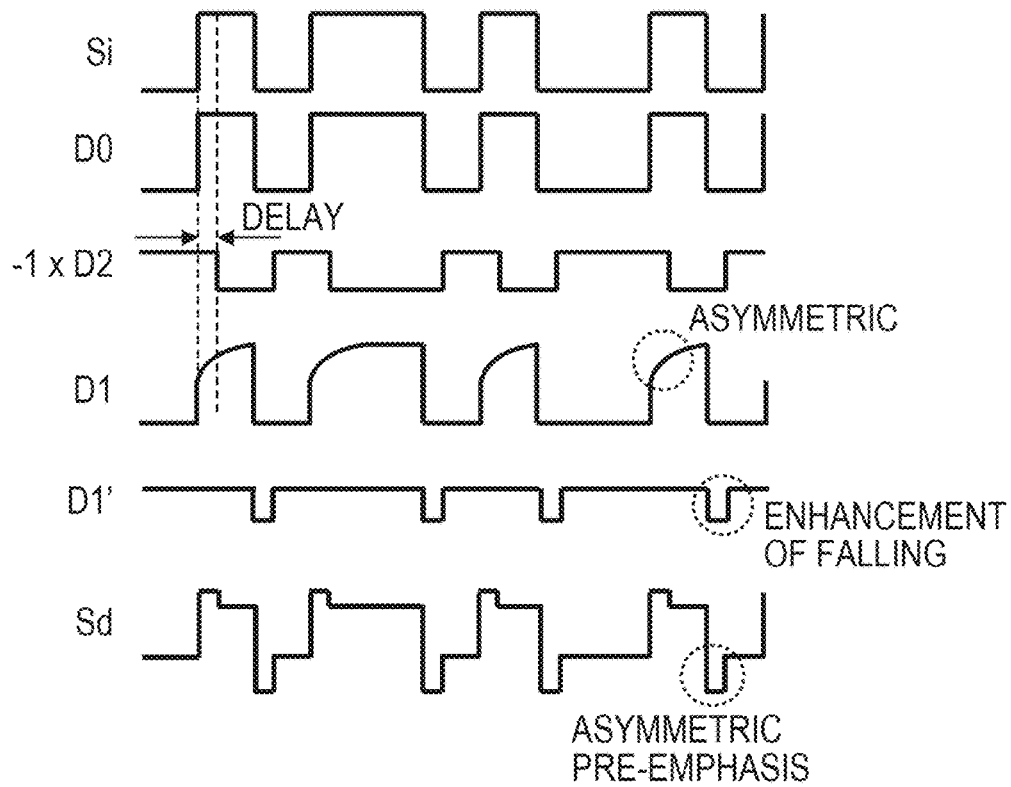

FIGS. 10A and 10B are diagrams for describing a second embodiment of a light emitting device driving circuit. Herein, FIG. 10A schematically illustrates a configuration for driving the light-emitting device (LD) 2 by the driving electrical signal Sd generated by the light-emitting device driving circuit 1, and FIG. 10B illustrates each signal in the light emitting device driving circuit 1 illustrated in FIG. 10A.

As apparent from the comparison between FIG. 10A and FIG. 4A described above, in a light emitting device driving circuit 1' of the second embodiment, the data signal D0 obtained by amplifying the input signal Si by the amplifier 13 is merely input in the adding terminal (third terminal) of an adding circuit 14' and input in the asymmetric circuit 15. Further, after the input signal Si is branched and delayed by the delay unit 11, the branched data signal D2 amplified by the amplifier 12 is input in the subtracting terminal (second terminal) of the adding circuit 14'. In addition, the main data signal D1 which is the output of the asymmetric circuit 15 is input in the adding terminal (first terminal) of the adding circuit 14' via a capacitor C3. That is, the output of the asymmetric circuit 15 is input in the adding circuit 14' using capacitive coupling by the capacitor C3, only a falling edge signal is extracted to perform addition/subtraction by the adding circuit 14', thereby generating the asymmetric pre-emphasis signal (driving electrical signal) Sd.

Third Embodiment

Figure 11:
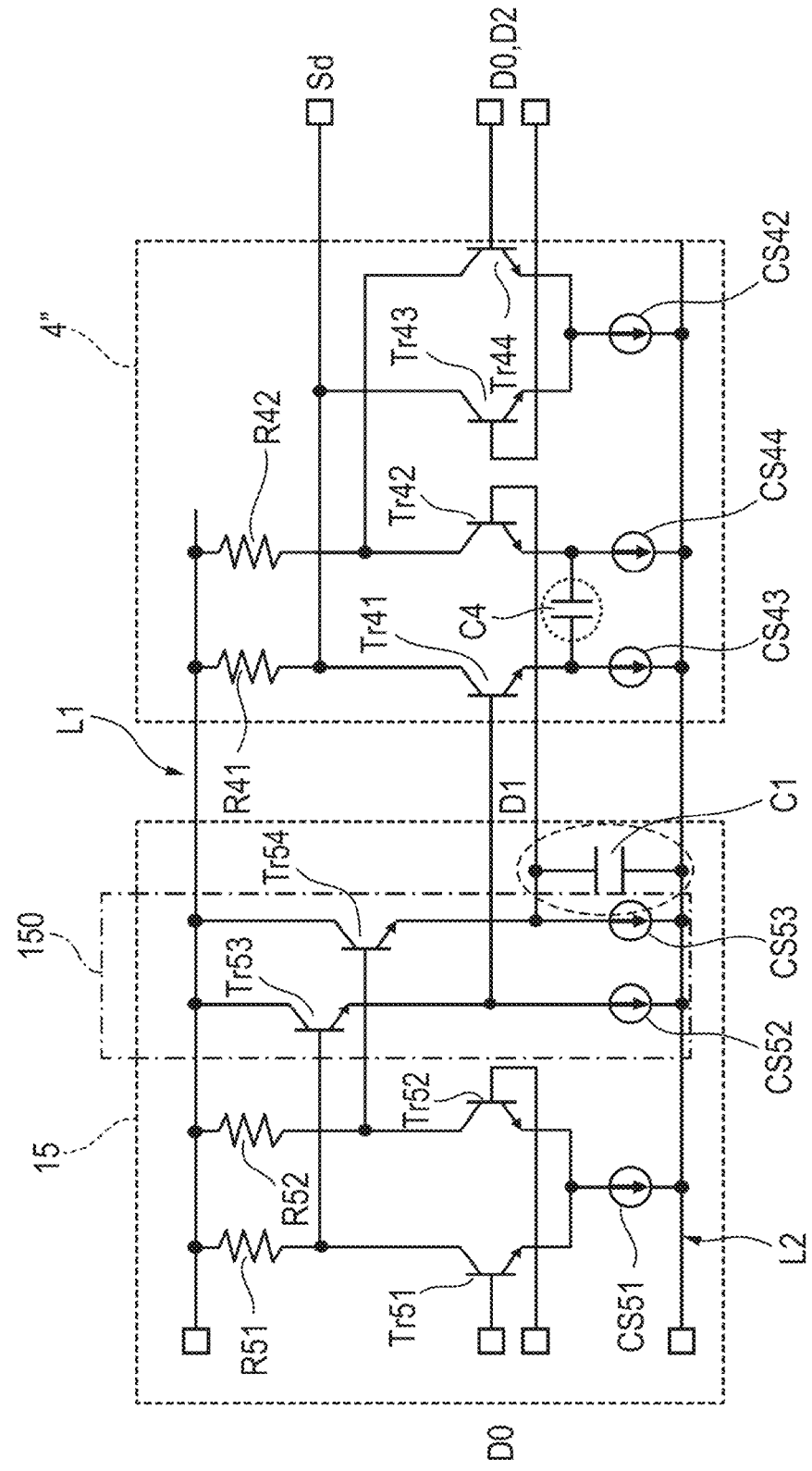
FIG. 11 is a circuit diagram for describing a third embodiment of a light emitting device driving circuit.

FIG. 11 is a circuit diagram for describing a third embodiment of a light emitting device driving circuit. As apparent from the comparison between FIG. 11 and FIG. 4A described above, in the light emitting device driving circuit of the third embodiment, the emitters of the transistors Tr41 and Tr42 in an adding circuit 14" are not commonly connected but connected to the second power supply line L2 via the current sources CS43 and CS44, respectively. In addition, a capacitor C4 is provided between the emitters of the transistors Tr41 and Tr42. As described above, the emitters of the transistors Tr41 and Tr42 in the adding circuit 14" are capacitively coupled to each other by the capacitor C4 to efficiently perform signal generation of performing addition/subtraction by extracting only the falling edge signal.

Figure 12:
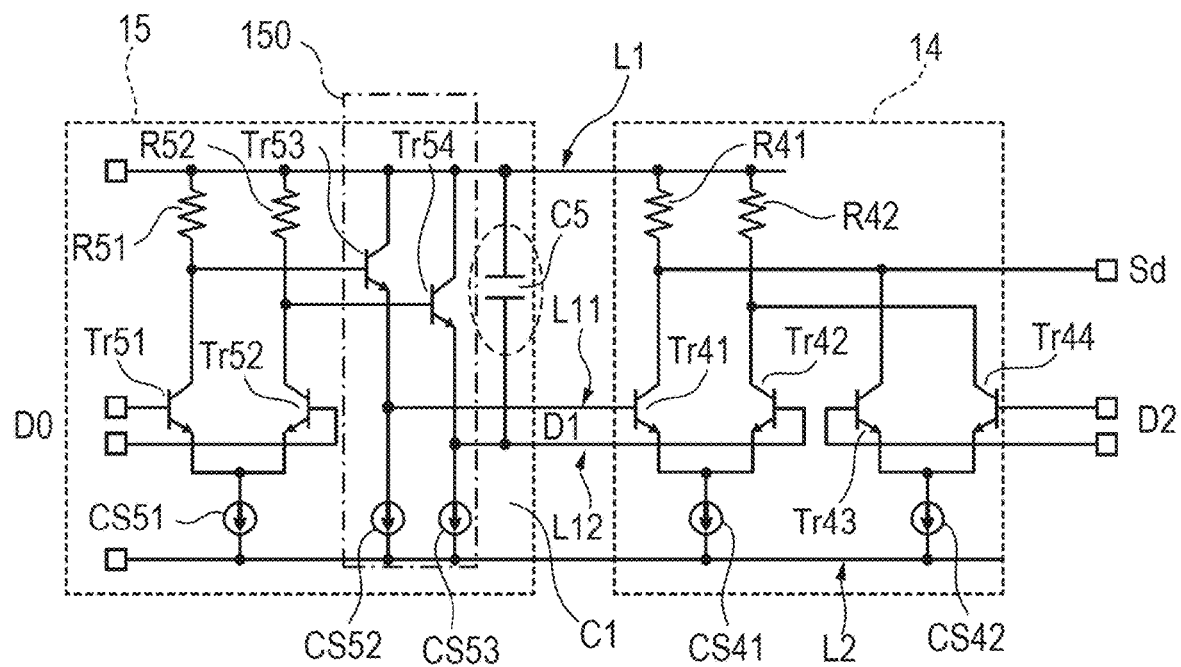
FIG. 12 is a circuit diagram illustrating a modified example of the light emitting device driving circuit illustrated in FIGS. 4A to 4C.

FIG. 12 is a circuit diagram illustrating a modified example of the light emitting device driving circuit illustrated in FIGS. 4A to 4C. As apparent from the comparison between FIG. 12 and FIG. 4B, an asymmetric generation capacitor C5 is provided instead of the capacitor C1 in FIG. 4B in the modified example. That is, in the first embodiment illustrated in FIG. 4B, the capacitor C1 is provided (connected) between the emitter (signal line L12) of the transistor Tr54 and the second power supply line L2. Contrary to this, in the modified example illustrated in FIG. 12, the capacitor C5 is provided between the signal line L12 and the first power supply line L1.

Herein, the asymmetric generation capacitor C5 or C1 is not particularly provided, for example, between the signal line (signal path) L12 of the main data signal D1, and the first power supply line L1 or the second power supply line L2, but may be connected between points (fixed potential points) of which potentials are alternately fixed. Further, even for a location (point) or the size (capacitance value) at which the asymmetric generation capacitor C1 is provided, the driving electrical signal for compensating for the asymmetric light emitting characteristic of the light emitting device 2 may be generated. In addition, the bipolar transistor and the MOS transistor or the compound semiconductor may be applied to the driving circuit as described above.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A driver circuit that drives a light emitting device, the driver circuit comprising:
   an asymmetric circuit configured to receive an input signal and include a first capacitor coupled to the input signal and directly coupled to a signal having a fixed electric potential so as to generate a first signal in which a rising portion and a falling portion are asymmetric to each other using the input signal;
   a delay circuit configured to receive the input signal and delay the input signal so as to generate a second signal; and
   an adder circuit configured to add the first signal and the second signal so as to generate a drive signal for driving the light emitting device.

2. The driver circuit according to claim 1, wherein the first signal and the second signal are differential signals, and wherein the first capacitor is coupled to at least one of the input signal and an inverted input signal of the differential signal and the signal having the fixed electric potential directly.

3. The driver circuit according to claim 2, wherein the driver circuit is formed by using bipolar transistors.

4. The driver circuit according to claim 2, wherein the asymmetric circuit is configured to include emitter follower circuits to transmit the first signal.

5. The driver circuit according to claim 1, further comprising:
   a first amplifier configured to amplify the input signal; and
   a second amplifier configured to amplify a signal delayed by the delay circuit so as to generate the second signal, wherein the asymmetric circuit is arranged between the first amplifier and the adder circuit.

6. The driver circuit according to claim 5, wherein the adder circuit is configured to include a first terminal configured to receive the first signal, and a second terminal is configured to receive the second signal.

7. The driver circuit according to claim 6, wherein the adder circuit is further configured to include a third terminal configured to receive the input signal amplified by the first amplifier.

8. The driver circuit according to claim 7, further comprising: a second capacitor coupled to the asymmetric circuit and the first terminal so as to detect edges of the first signal.

9. The driver circuit according to claim 1, wherein the signal having the fixed electric potential is a power supply line.

10. The driver circuit according to claim 1, wherein the light emitting device is a laser diode having an asymmetric light emitting characteristic.

11. The driver circuit according to claim 10, wherein the laser diode is a vertical cavity surface emitting laser.

12. The driver circuit according to claim 1, wherein the adder circuit is further configured to include a third capacitor that is coupled to the input signal and the signal having the fixed electric potential.

13. The driver circuit according to claim 8, wherein the second capacitor is arranged in the adder circuit.

14. An optical module comprising:
a light emitting device; and
a driver circuit configured to include:
an asymmetric circuit configured to receive an input signal and include a first capacitor coupled to the input signal and directly coupled to a signal having a fixed electric potential so as to generate a first signal in which a rising portion and a falling portion are asymmetric to each other using the input signal,
a delay circuit configured to receive the input signal and delay the input signal so as to generate a second signal, and
an adder circuit configured to add the first signal and the second signal so as to generate a drive signal for driving the light emitting device.

15. An active optical cable comprising:
an optical fiber;
a plug configured to be coupled to an end of the optical fiber; and
an optical module configured to be coupled to the plug and include:
a light emitting device; and
a driver circuit configured to include:
an asymmetric circuit configured to receive an input signal and include a first capacitor coupled to the input signal and directly coupled to a signal having a fixed electric potential so as to generate a first signal in which a rising portion and a falling portion are asymmetric to each other using the input signal,
a delay circuit configured to receive the input signal and delay the input signal so as to generate a second signal, and
an adder circuit configured to add the first signal and the second signal so as to generate a drive signal for driving the light emitting device.

* * * * *